US 6,531,790 B2

(12) United States Patent
Panuce et al.

(10) Patent No.: US 6,531,790 B2
(45) Date of Patent: Mar. 11, 2003

(54) GENERATOR TRANSFER SWITCHING SYSTEM WITH MULTIPLE GENERATOR MODES

(75) Inventors: Donald G. Panuce, Longboat Key, FL (US); Michael J. Keenan, Bradenton, FL (US)

(73) Assignee: Advanced Controls, Inc., Bradenton, FL (US)

( * ) Notice: Subject to any disclaimer, the term of this patent is extended or adjusted under 35 U.S.C. 154(b) by 204 days.

(21) Appl. No.: 09/818,883

(22) Filed: Mar. 27, 2001

(65) Prior Publication Data

US 2002/0017821 A1 Feb. 14, 2002

Related U.S. Application Data

(63) Continuation-in-part of application No. 09/631,048, filed on Aug. 1, 2000, now abandoned.

(51) Int. Cl.[7] .................................................. H02J 9/00
(52) U.S. Cl. .............................. 307/64; 307/23; 307/29
(58) Field of Search .............................. 307/64–66, 70, 307/23, 25, 29; 200/14, 16 A, 18

(56) References Cited

U.S. PATENT DOCUMENTS

| 4,507,720 A | 3/1985 | Colbrese |
| 4,612,495 A | 9/1986 | Yamauchi et al. |
| 5,266,838 A | 11/1993 | Gerner |
| 5,268,850 A | 12/1993 | Skoglund |
| 5,515,235 A | * 5/1996 | Stoller .................. 361/605 |
| 5,581,133 A | 12/1996 | Smith et al. |
| 5,583,419 A | * 12/1996 | Haller .................. 307/29 |
| 5,721,449 A | 2/1998 | Panuce |
| 5,790,399 A | * 8/1998 | Campbell .................. 307/29 |
| 5,895,981 A | 4/1999 | Flegel |
| 6,005,307 A | 12/1999 | Biquez et al. |
| 6,184,593 B1 | * 2/2001 | Jungreis .................. 307/64 |
| 2002/0125115 A1 | * 9/2002 | Burkholder et al. ..... 200/51.11 |

\* cited by examiner

Primary Examiner—Fritz Fleming
(74) Attorney, Agent, or Firm—Bullwinkel Partners, Ltd.

(57) ABSTRACT

A generator transfer switching system having a multi-position generator transfer switch that enables a homeowner or user to manually select a group of circuits from among a number of pre-selected groups of circuits for transfer from utility company service to a standby generator via a single cam-operated switch. The multi-position generator transfer switch is comprised of a contact block having multiple stages with a shaft and a handle to turn the shaft. Each stage contains electrical contacts and cams operably connected to the contacts. The cams are mounted on a shaft running through the center of the block and connected at one end to a handle. The handle can be manually turned to switch a group of selected household circuits from the utility company service to an electric generator service. The switch eliminates the potential for electrical back feed from either the utility company to the generator or from the generator to the utility company.

7 Claims, 4 Drawing Sheets

120 VOLT CIRCUITS BACK TO HOUSE

120 VOLT CIRCUITS FROM HOUSE

GENERATOR INPUT

| STAGES | 1 | | 2 | | 3 | | 4 | | 5 | | 6 | |
|---|---|---|---|---|---|---|---|---|---|---|---|---|
| CONTACTS | 1/2 | 3/4 | 5/6 | 7/8 | 9/10 | 11/12 | 13/14 | 15/16 | 17/18 | 19/20 | 21/22 | 23/24 |
| LINE 1 | X | | X | | X | | X | | X | | X | |
| GEN 1 | | X | | X | | | | | | | | |
| GEN 2 | | | | | | | X | X | | | | |
| GEN 3 | | | | | | | | | | | X | X |
| GEN | | X | | X | | X | | X | | X | | X |

| STAGES | 1 | | 2 | | 3 | | 4 | | 5 | | 6 | |
|---|---|---|---|---|---|---|---|---|---|---|---|---|
| CONTACTS | 1 2 | 3 4 | 5 6 | 7 8 | 9 10 | 11 12 | 13 14 | 15 16 | 17 18 | 19 20 | 21 22 | 23 24 |
| LINE | X | | X | | X | | X | | X | | X | |
| OFF | | | | | | | | | | | | |
| GEN 1 | | X | | X | | | | | | | | |
| GEN 2 | | | | | | X | | X | | | | |
| GEN 3 | | | | | | | | | | | X | X |
| GEN | | X | X | X | X | X | X | X | X | X | | |

GENERATOR TRANSFER SWITCHING SYSTEM WITH MULTIPLE GENERATOR MODES

CROSS REFERENCE TO RELATED APPLICATION

This is a continuation-in-part of application Ser. No. 09/631,048 filed Aug. 1, 2000, now abandoned.

BACKGROUND

1. Field of the Invention

This patent relates to manually operated electrical switching systems. More particularly, this patent relates to a system for switching a selected group of household circuits from utility company service to a standby generator using a single manual switch.

2. Description of the Related Art

Typically, local electric utility companies supply the alternating current for household electrical power. If the utility supplied electrical power is somehow interrupted, a portable generator system can be used to temporarily maintain electrical power needed for critical systems, such as heating, refrigeration, hot water and lighting. Typically, this type of system is used for a household, but the same system could be used in commercial, industrial, municipal and farm applications. For the sake of simplicity and clarity, these additional applications are included in all situations referred to hereafter as "household".

The portable generator usually is placed outside the building and is connected to a generator transfer panel located inside the building. This connection can be made via an exterior mounted power inlet box or via a direct connection to the generator transfer panel. The generator transfer panel is connected via an electrical conduit or cable to the main electrical panel or load center. The generator transfer panel is typically mounted adjacent to the main electric panel. Inside the generator transfer panel is the transfer switching mechanism (and other components as outlined below) that directs the flow of electricity from either the utility company or the generator to selected electrical circuits in the building.

Because generator capacity is usually less than the building's total electrical demand, it is usually desirable to limit the number of circuits running on the generator. This is accomplished with the aid of the transfer switching mechanism inside the generator transfer panel. Conventional transfer switching mechanisms typically employ eight to ten double pole rocker type switches (a.k.a. double pole/double throw switches) to control the path of electricity from the generator to the load center.

A disadvantage of such conventional transfer switching mechanisms is that they involve a complicated system of multiple switches and circuit breakers that can lead to mistakes in transferring electrical power to the desired circuits. Also, conventional transfer switches do not have positive break contacts and so can lead to accidental back feed into the generator from the utility or into the utility from the generator. If a feedback situation occurs, a short circuit can develop causing a fire or explosion. Also, conventional transfer switches require more than one power feed from the generator, which increases complexity and can lead to wiring errors during installation.

Thus it is an object of the present invention to provide a simple system to transfer electrical power from utility company service to a standby generator.

A further object of the present invention is to provide a system for switching a group of circuits from among a number of groups of pre-selected circuits from utility company service to standby generator service using a single multi-position switch.

A still further object of the present invention is to provide a switching system that prevents the possibility of back feed either from the generator to the utility or from the utility to the generator.

A still further object of the present invention is to provide a generator transfer switching system that provides a common generator feed with a single switch to all selected household circuits.

Yet another object of the present invention is to provide a switching system that uses a conventional cam-type switch to transfer generator power to a selected group of household circuits.

Still another object of the present invention is to provide a generator transfer system that can be readily expanded or reduced to switch the appropriate number of household circuits.

Still another object of the present invention is to provide a generator transfer system that provides a means of installing either fuses or circuit breakers to provide short circuit protection for individual household circuits.

SUMMARY OF THE INVENTION

The present invention is a generator transfer switching system that enables a user to select, using a multi-position generator transfer switch, which household circuits to transfer over to generator service. The system comprises an electrical generator, a multi-position generator transfer switch and a main electrical panel. The multi-position generator transfer switch is electrically interposed between the electrical generator and the main electric panel.

The multi-position generator transfer switch comprises a contact block having multiple stages, each stage containing electrical contacts and operable cams connected to the contacts. The cams are mounted on a shaft running through the center of the block and connected at one end to a handle. The handle can be manually turned to select which household circuits are to be converted from utility company service to electric generator service.

THE DRAWINGS

DETAILED DESCRIPTION OF THE INVENTION

Figure 1:
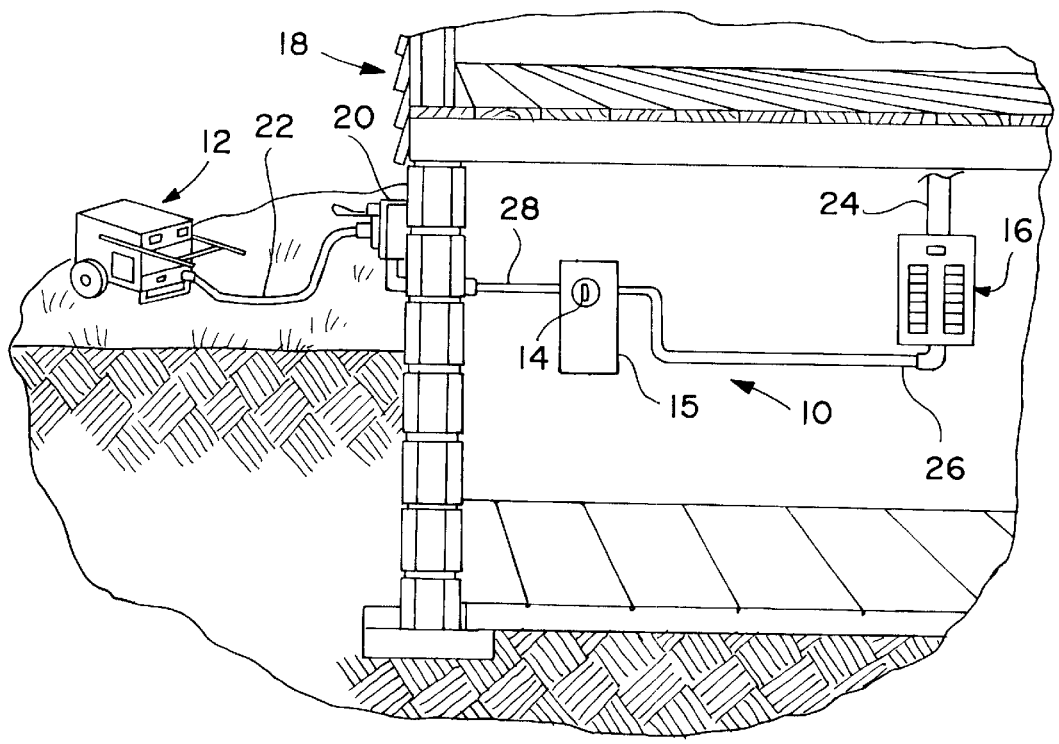
FIG. 1 is a schematic representation of one embodiment of the present invention.

Turning to the drawings, there is shown in FIG. 1 a schematic representation of the generator transfer switching system of the present invention. The system (10) comprises a generator (12), a multi-position transfer switch (14) and a main electrical panel (16). Typically the generator (12) is located outside the house or building (18) and is plugged into an exterior power inlet (20) via an electrical cord (22). The electrical panel (16) typically is mounted inside the house or building (18) and contains the main fuses or circuit breakers for the building (18). Utility power enters the electrical panel (16) via electrical cable or wire in an electrical conduit (24). A second conduit (26) carries selected circuits to and from the multi-position transfer switch (14).

The multi-position transfer switch (14) is electrically interposed between the generator (12) and the main electrical panel (16) and is generally mounted on a wall inside the house or building (18). Electrical cable or wire in conduit (28) connects the multi-position transfer switch (14) to the power inlet (20) which is connected to the generator 12 through cable (22). The multi-position transfer switch (14) may be mounted in a cabinet or other housing (15), with or without accessory items such as fuses or circuit breakers, watt meters, volt meters, amp meters, a generator plug-in connector, and wire leads to the main electrical panel or load center. Household circuits enter the multi-position transfer switch (14) via electrical conduit (26) and exit via the same electrical conduit (26).

Figure 2:
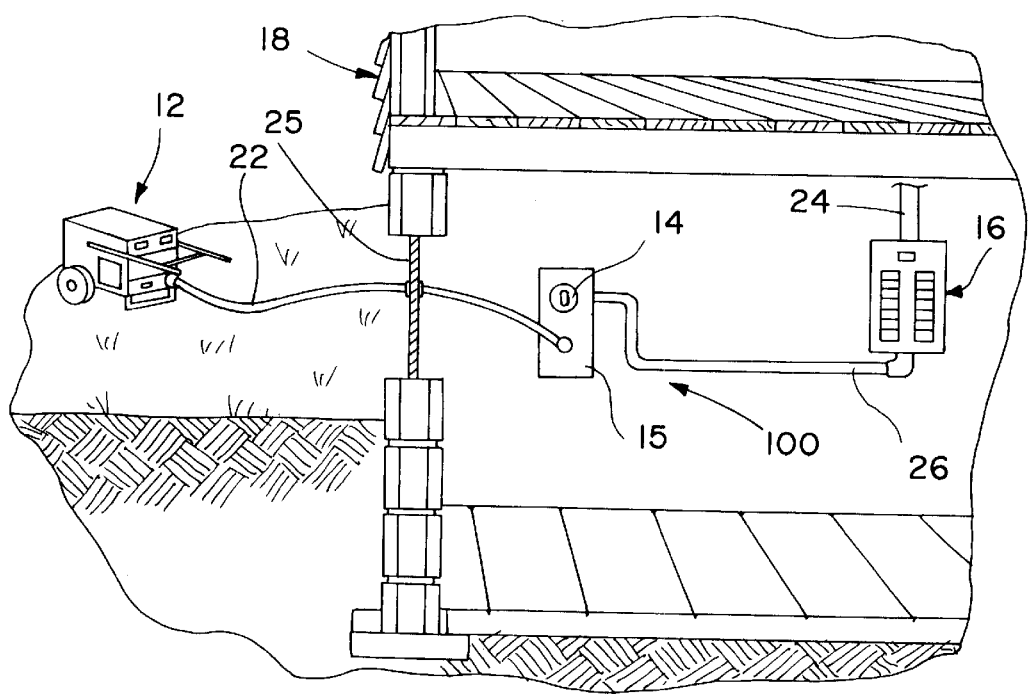
FIG. 2 is a schematic representation of an alternate embodiment of the present invention.

Alternatively, as shown in FIG. 2, the system (100) comprises a generator (12) connected directly to the multi-position transfer switch (14) by a cord or conduit (22). Access to the multi-position transfer switch (14) is through a window, door or other opening (25) in the building (18). A power inlet is not used. The multi-position transfer switch (14) is connected directly to the generator (12) through electrical cord (22) and to the electrical panel (16) through electrical conduit (26). As explained in detail below, both embodiments of the system enable a homeowner or user to manually switch a selected group of household circuits from utility company service to the standby generator (12).

The multi-position generator transfer switch (14) preferably is configured to have three or more operating modes: LINE mode and two or more GENERATOR modes. In LINE mode, electrical power is received from the utility and routed through the switch directly to all the household circuits. No power is sent to or received from the generator. This would be the normal operating position of the switch (14). In any of the GENERATOR modes, a selected group of critical household circuits is removed from utility company service and connected to the generator. The selected group of circuits then receives its electrical power from the generator (12). All other circuits would be without power as long as the power from the utility company is unavailable. No power is sent to the utility company or the circuits that remain connected to the utility company. The selected GENERATOR mode would be used during an interruption in the electrical service from the utility, such as during a storm, power outage or brown out.

Figure 3:
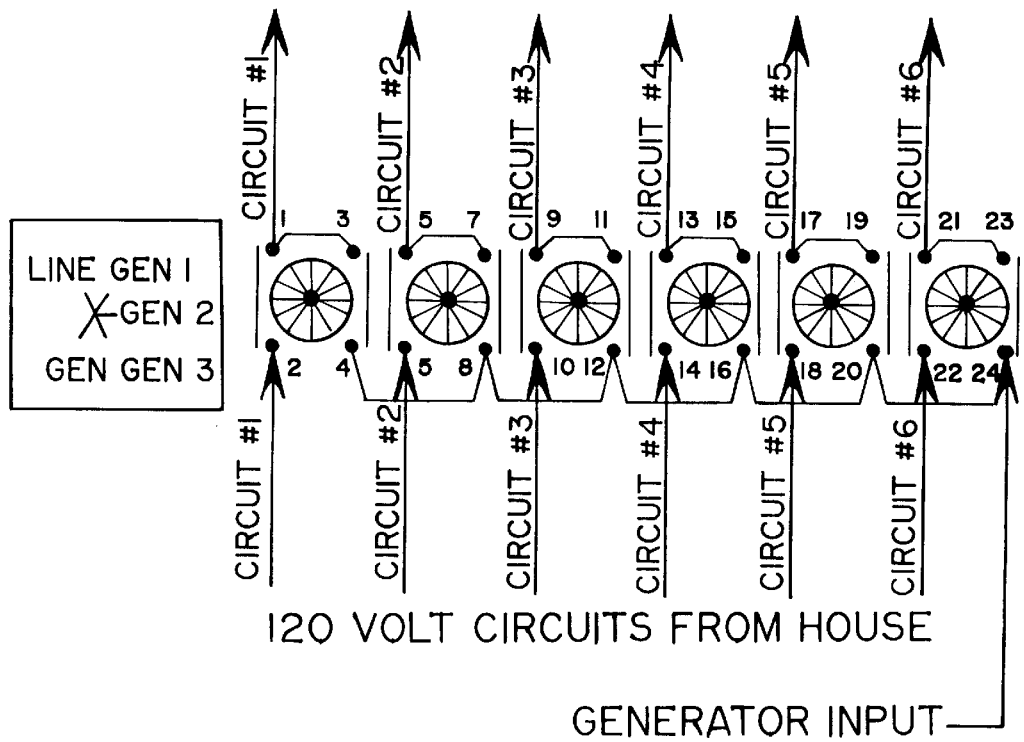
FIG. 3 is a diagram showing the wire connections of a five-mode generator transfer switch used in accordance with the present invention.

The top of FIG. 3 shows a wire connection diagram and the bottom of FIG. 3 shows a circuit truth table for one embodiment of a multi-position generator transfer switch used in accordance with the present invention. In the embodiment illustrated in FIG. 3, the multi-position generator transfer switch (14) has a LINE mode and four GENERATOR modes: GEN, GEN1, GEN2 and GEN3.

In GEN mode, the electrical power of all six pre-selected household circuits is removed from utility company service and connected to the generator. All other circuits would be without power until the power from the utility company is again available. In GEN1 mode, only circuits 1 and 2 are transferred over to generator power. In GEN2 mode, only circuits 3 and 4 are transferred over to generator power. In GEN3 mode, only circuits 5 and 6 are transferred over. Thus, with the multi-position switch (14) of FIG. 3, the user has the choice of four different groups of circuits to be transferred to generator power in case of a utility power interruption.

Figure 4:
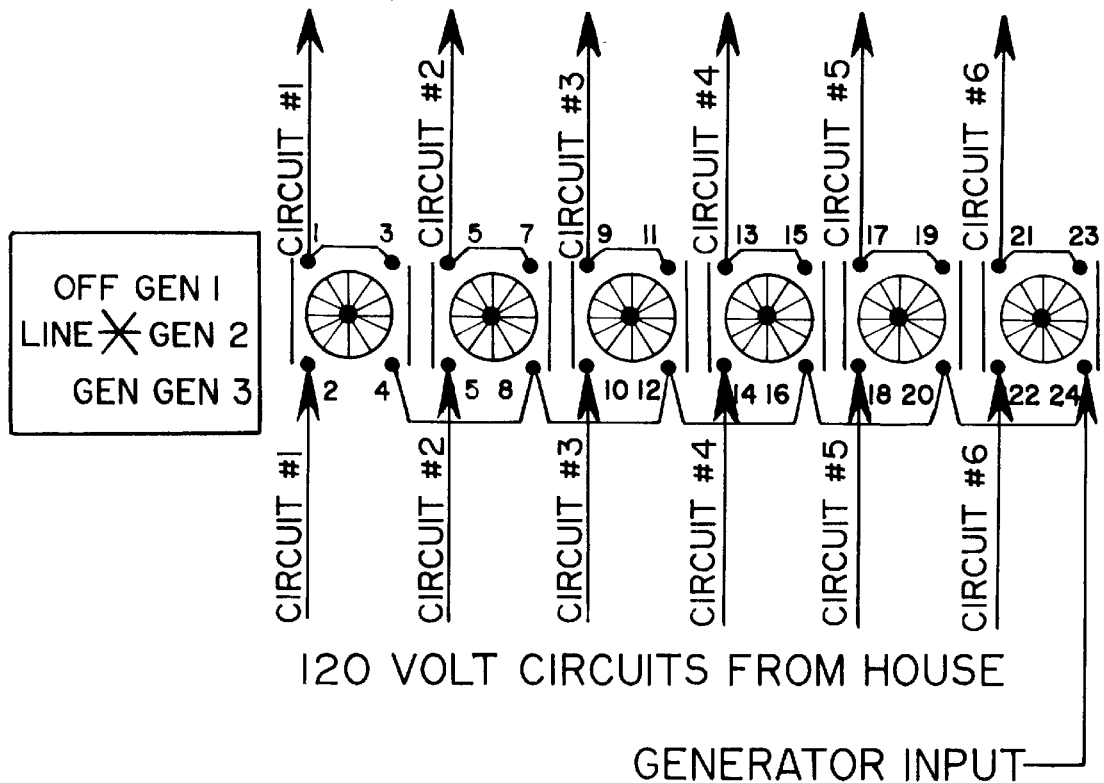
FIG. 4 is a diagram showing the wire connections of a six-mode generator transfer switch used in accordance with the present invention.

In the five-mode embodiment shown in FIG. 3, one or more critical household circuits in the main electrical panel are always connected to either the utility or the portable generator. In an alternative embodiment shown in FIG. 4, an additional OFF setting is provided. In the OFF setting, electrical power to all selected household circuits is completely interrupted. No power is available to the selected household circuits from either the utility company or the generator.

The generator transfer switch (14) is a manually operated cam-type switch of the type disclosed in U.S. Pat. No. 5,721,449, incorporated herein by reference. As explained therein, each stage of the transfer switch comprises a pair of double make/break contacts. Each double make/break contact comprises a pair of stationary electrical contacts (numbered 1–24 in FIGS. 3 and 4) and two movable contacts (represented in FIGS. 3 and 4 by vertical bars). Metal jumpers or bridges are used to permanently connect selected stationary contacts. For example, in FIG. 3, contact pairs 1–3, 5–7, 9–11, 13–15, 17–19 and 21–23 are connected and contacts 4, 8, 12, 16, 20 and 24 are connected.

The moveable contacts have at either end a contact point for engagement with the stationary contacts. Each moveable contact is contained in a follower (not shown in the Figures) that is acted upon by a cam (represented by circles in FIGS. 3 and 4) mounted on a central shaft. Each cam has a profile cut into the cam face that determines the switching pattern.

Figure 5:
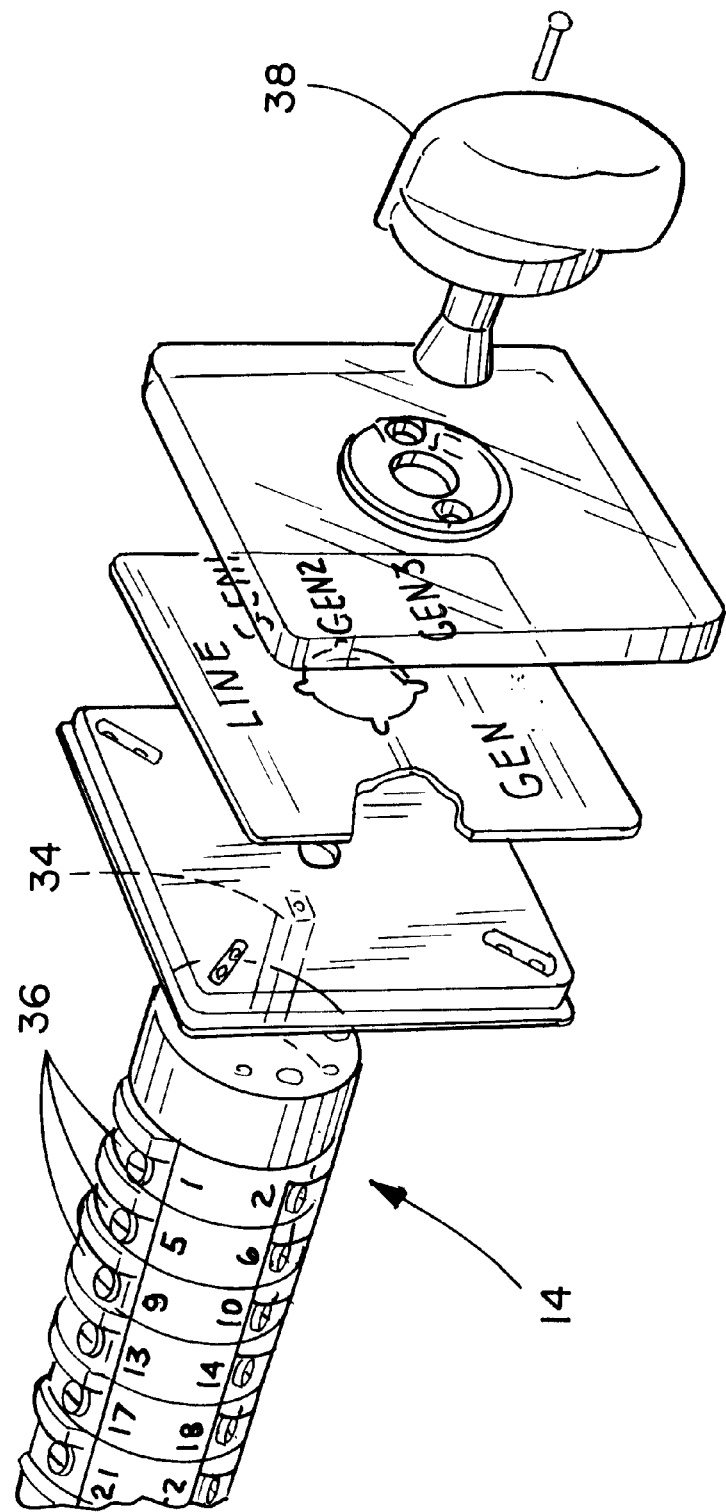
FIG. 5 is a schematic view of a multi-position transfer switch for use with the present invention.

As best shown in FIG. 5, the shaft (34) connects all the stages (36) together, and is itself connected to an operating handle (38). The operating handle can be turned by the user to the LINE, GEN, GEN1, GEN2 or GEN3 positions or, if available, to the OFF position. By varying the shape of the cams, the orientation of the cams on the shaft, and the electrical interconnections (metal bridges) between the stationary contacts, various switching patterns can be achieved by the factory to switch a desired number of household circuits from utility company service to a standby generator and vice versa.

Should a movable contact point weld to a stationary contact, the manual switch cannot be turned. This feature alerts the homeowner to a problem with the switch and also eliminates any possibility of a back feed from the generator into the utility power or from the utility power system to the generator.

The generator transfer system thus provides a common generator feed from a single manual switch to all selected household circuits. In addition, the transfer switch provides positive break contacts that eliminate the possibility of back feed into the utility or generator power system. The design of the transfer switch can easily be expanded or reduced to allow switching additional household circuits.

Like the inverter bypass switch shown in U.S. Pat. No. 5,721,449, the multi-position generator transfer switch (14) preferably has six stages for switching up to six household circuits at once. By adding or reducing stages to the multi-position generator transfer switch, the switch can easily be expanded or reduced by the factory to handle additional or fewer household circuits. Unlike the switch described in U.S. patent application Ser. No. 09/631,048, the multi-position transfer switch (14) has more than one GENERATOR mode.

The system is operated in the following manner. Under normal operating conditions, the multi-position generator transfer switch is set to LINE mode and all the household circuits receive their electrical power from the utility. Referring to the truth table in FIG. 3, for the illustrated switch embodiment, only stationary contacts 1–2, 5–6, 9–10, 13–14, 17–18 and 21–22 are in contact with the respective moveable contacts. If the utility power is interrupted and the homeowner needs to power up certain critical household systems, such as heating, refrigeration, hot water or lighting, the homeowner connects a portable electrical generator to the power inlet (20) or directly to transfer switch (14), and turns the multi-position transfer switch (14) from LINE to one of the four GENERATOR modes: GEN, GEN1, GEN2 or GEN3, depending on which circuits he wishes to connect to the generator.

For example, in GEN2 mode, power from the generator passes through the multi-position transfer switch into the pre-selected household circuits 3 and 4. Referring to FIG. 3, only stationary contact pairs 11–12 and 15–16 are in contact with the respective moveable contacts. Once utility power is reestablished, the homeowner can switch all selected household circuits, including circuits 3 and 4, back to utility supplied power by simply turning the manual switch from GEN2 to LINE.

Thus there has been described a generator transfer switching system having a multi-position transfer switch that enables a homeowner or other user to switch a selected group of household circuits from utility company service to a standby generator using a single manual switch without the possibility of creating a back feed.

The system has been described with respect to residential buildings. The system can also be used in other applications such as apartment buildings, commercial buildings, farm buildings, industrial buildings, hospitals, telecommunications systems, TV and radio stations, water treatment plants, airports, and other applications in which power cannot be interrupted.

Although the foregoing invention has been described in some detail for purposes of clarity and understanding, it will be obvious that certain modifications and alternative embodiments to the invention are contemplated which do not depart from the spirit and scope of the invention as defined by the foregoing teachings and appended claims.

We claim as our invention:

1. A generator transfer switching system for manually switching a desired group of pre-selected circuits from utility company service to a standby generator, said system comprising:

an electrical generator;

a main electrical panel comprising multiple circuits; and a multi-position generator transfer switch electrically interposed between the electrical generator and the main electrical panel, said generator transfer switch comprising multiple stages, each stage containing a pair of double make/break contacts, said double make/break contacts comprising a pair of stationary contacts and two moveable contacts, each moveable contact operably connected to a cam, each cam mounted on a shaft disposed along a central axis of the generator transfer switch, said shaft having at one end a handle, said multi-position generator transfer switch having two or more GENERATOR modes wherein for each GENERATOR mode a group of pre-selected circuits is removed from utility service and connected to standby generator service;

wherein manually turning the handle switches a desired group of pre-selected circuits from utility company service to the standby generator.

2. The generator transfer switching system of claim 1 wherein the electrical panel comprises circuit breakers for short circuit protection.

3. The generator transfer switching system of claim 1 wherein the multi-position generator transfer switch has a LINE mode of operations in which electrical power is routed from the utility through the transfer switch directly to the circuits.

4. The generator transfer switching system of claim 3 wherein the multi-position generator transfer switch further comprises an OFF mode of operation in which electrical power to the circuits is completely interrupted.

5. The generator transfer switching system of claim 1 wherein the transfer switch provides positive break contacts that eliminate the possibility of back feed into the utility company service or standby generator.

6. The generator transfer switching system of claim 1 wherein the number of circuits capable of being switched over to generator power can be expanded by adding stages of the transfer switch.

7. The generator transfer switching system of claim 1 further comprising circuit breakers or fuses to provide short circuit protection for individual circuits.

* * * * *